United States Patent
Thorn

(10) Patent No.: US 12,282,205 B1
(45) Date of Patent: Apr. 22, 2025

(54) GLASSES FOR THE HEARING IMPAIRED

(71) Applicant: David Thorn, Gaithersburg, MD (US)

(72) Inventor: David Thorn, Gaithersburg, MD (US)

( * ) Notice: Subject to any disclaimer, the term of this patent is extended or adjusted under 35 U.S.C. 154(b) by 226 days.

(21) Appl. No.: 17/984,987

(22) Filed: Nov. 10, 2022

(51) Int. Cl.
*G02C 11/06* (2006.01)
*G02C 11/00* (2006.01)

(52) U.S. Cl.
CPC .............. *G02C 11/06* (2013.01); *G02C 11/10* (2013.01)

(58) Field of Classification Search
CPC .......... H04R 1/105; G02C 11/10; G02C 11/06
USPC ................................................. 381/381, 327
See application file for complete search history.

(56) References Cited

U.S. PATENT DOCUMENTS

| 5,029,216 | A | 7/1991 | Jhabvala et al. | |
|---|---|---|---|---|
| 7,645,041 | B2 * | 1/2010 | Frare | G02C 11/04 351/158 |
| 11,300,814 | B1 * | 4/2022 | Meisenholder | G02C 11/10 |

* cited by examiner

*Primary Examiner* — Sunita Joshi
(74) *Attorney, Agent, or Firm* — Sanchelima & Associates, P.A.; Jesus Sanchelima; Christian Sanchelima

(57) ABSTRACT

Glasses for the hearing impaired including a frame assembly, an audio assembly and a visual assembly. Frame assembly includes a left rim, a right rim, temples, and a compartment, wherein the compartment is placed in a portion of at least one of the temples. Audio assembly includes an integral processor device housed in the compartment, a left microphone and a right microphone housed inside the left rim and the right rim respectively. Visual assembly includes a left LED set and a right LED set attached to a portion of a rear surface of the left rim and a right rim respectively. Left rim LEDs and right rim LEDs, left microphone, right microphone and integral processor device are operatively connected to the integral processor device and powered by means of a battery.

9 Claims, 3 Drawing Sheets

GLASSES FOR THE HEARING IMPAIRED

BACKGROUND OF THE INVENTION

1. Field of the Invention

The present invention relates to glasses and, more particularly, to glasses for the hearing impaired that includes a microphone and a set of LEDs on the frame, wherein the microphone picks up audio signal which is processed to provide lighting indications to the user with any degree of hearing loss.

2. Description of the Related Art

Several designs for glasses for the hearing impaired have been designed in the past. None of them, however, include a microphone incorporated on the glasses frame, wherein pick up audio signals which are processed by an integral electronic device to provide visual indications by means of LED's integrated along the periphery of the lens's frame.

Applicant believes that a related reference corresponds to U.S. Pat. No. 7,645,041 issued for sound lighting spectacles. Applicant believes that another related reference corresponds to U.S. Pat. No. 5,029,216 issued for visual aid for the hearing impaired. None of these references, however, teach of glasses for the hearing impaired having an integral microphone, a processor and electronic display means on the lenses, wherein the microphone picks up audio signals which are processed to provide lighting indication on the lenses for alerting the wearer of the intensity and direction of the audio in relation to the user's position.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide glasses that are receptive to sound which can show direction, volume and pitch in a visual representation.

It is another object of this invention to provide a visual aid for people with any degree of hearing loss.

It is still another object of the present invention to provide a microphone, a processor device and a battery placed into one pair of glasses.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
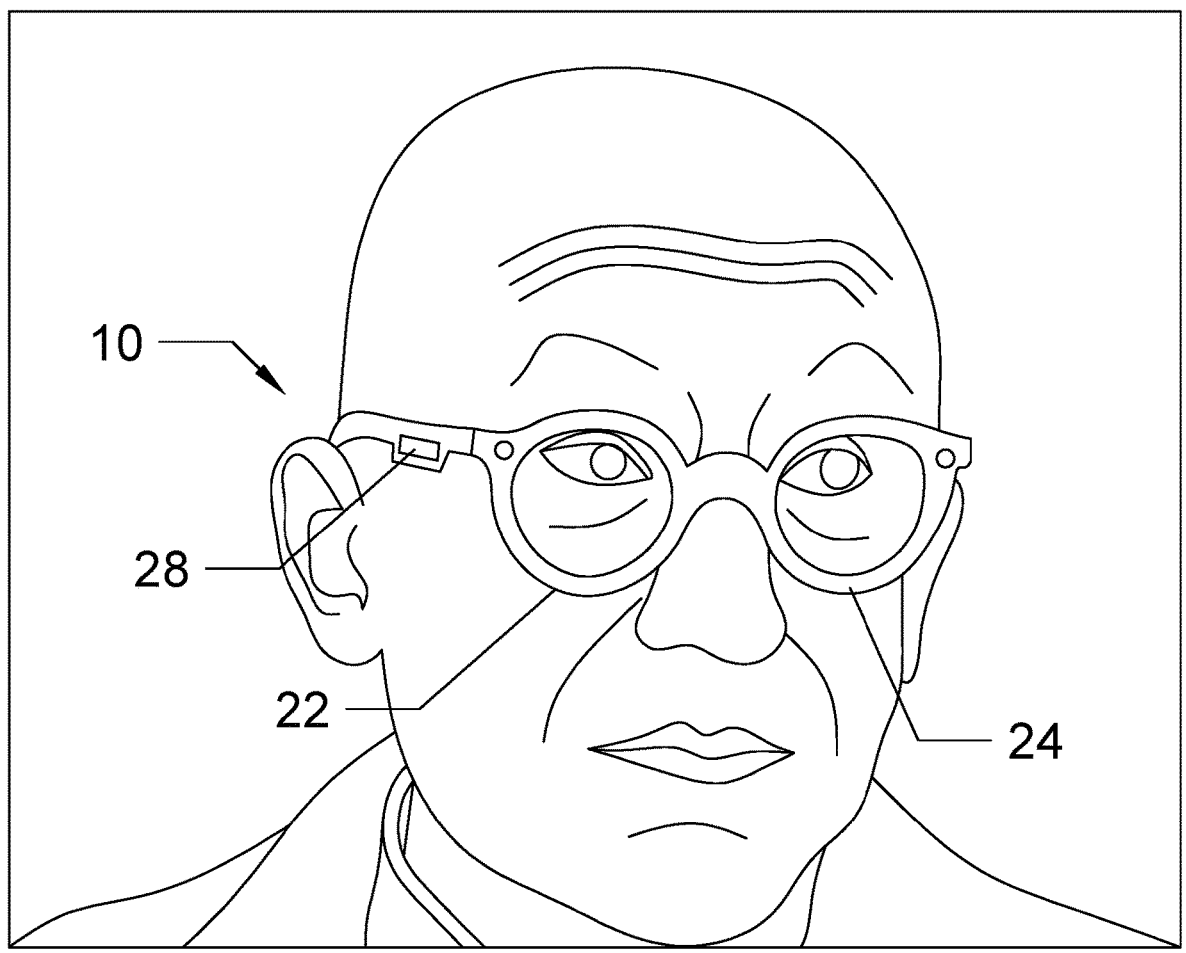
FIG. 1 represents an operational view of an exemplary embodiment of the present invention 10. Wherein a left microphone 42 is embedded inside a left rim 22 and a right microphone 44 is embedded inside a right rim 24.

Referring now to the drawings, where the present invention is generally referred to with numeral 10, it can be observed that it basically includes a frame assembly 20, an audio assembly 40, a visual assembly and an exemplary embodiment (100). It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
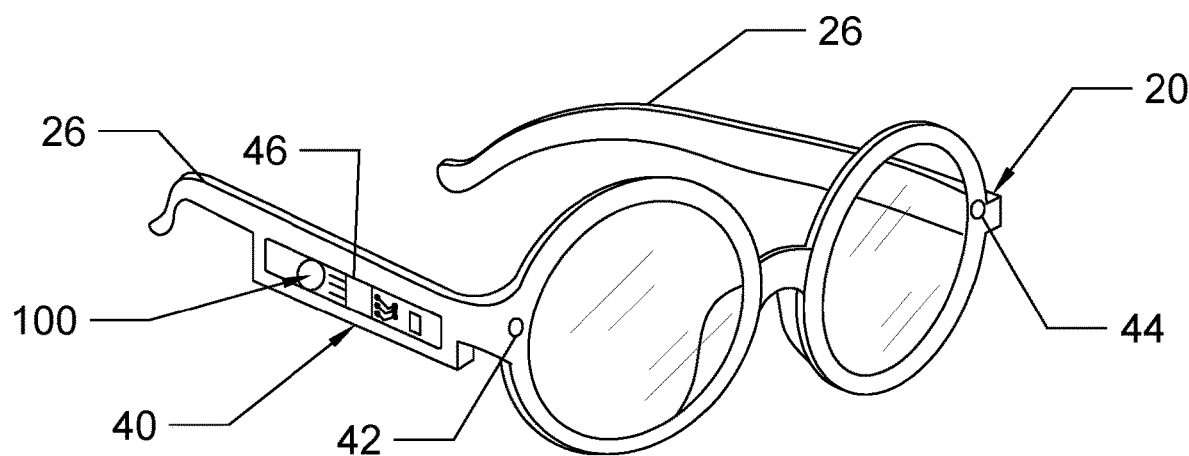
FIG. 2 shows an isometric view of the frame assembly 20, wherein at least one of the temples 26 has a suitable shape to include a compartment 28, thereby the integral processor device 46 is housed in the compartment 28.

Frame assembly 20 includes a left rim 22, a right rim 24, temples 26, and a compartment 28. In an exemplary embodiment, left rim 22 may have a round shape, a rectangle shape, a square shape, an oval shape, a regular shape, an irregular shape, or any other shape known in the art for glasses. In one embodiment, left rim 22 may be made of a metal material, a plastic material, a carbon fiber material, or any other suitable material known in prior art. Left rim 22 may have a centered hollow portion wherein a clear or tinted lens may be mounted therein, thereby the periphery of the left rim 22 surrounds the lens. In a preferred embodiment, left rim 22 may have a hole in a front surface thereof, wherein the hole permits to orientate an audible sound signal from the environment toward the interior of left rim 22. In other embodiment, right rim 24 may have a round shape, a rectangle shape, a square shape, an oval shape, a regular shape, an irregular shape, or any other shape known in the art for glasses. In an exemplary embodiment, right rim 24 may be made of a metal material, a plastic material, a carbon fiber material, or any other suitable material known in the art. Right rim 24 may have a centered hollow portion wherein a clear or tinted lens may be mounted therein, thereby the periphery of the right rim 24 surrounds the lens. In one embodiment, right rim 24 may have a hole in a front surface thereof, wherein the hole permits to orientate a sound signal from the environment, toward the interior of right rim 24. In an exemplary embodiment, a portion of the periphery of the left rim 22 and right rim 24 may be attached by means of a bridge, wherein said bridge may be a bridge for glasses well known in the art. In a preferred embodiment, a portion of the left rim 22 and right rim 24 may have attached temples 26 by means of a hinge mechanism, wherein said hinge mechanism allows the temples 26 to rotates from a perpendicular position with respect to the left rim 22 and right rim 24 toward a rear surface thereof. In a preferred embodiment, the temples 26 may include a compartment 28 in at least one of the temples 26, as FIG. 2 illustrates, wherein said compartment 28 may have a hollow portion with a removable cover. Nonetheless, it should be considered for frame assembly that may have a frame for glasses well known in the art.

Audio assembly 40 includes a left microphone 42, a right microphone 44 and an integral processor device 46. In an exemplary embodiment, left microphone 42 may be embedded in a portion inside the left rim 22, wherein the receptive area of the left microphone 42 may be parallel centered with respect to the hole from the left rim 22, allowing the left microphone 42 to receive without any interference the environment sounds. In one embodiment, right microphone 44 may be embedded in a portion inside the right rim 24, wherein the receptive area of the right microphone 44 may be parallel centered with respect to the hole from the right rim 24, allowing the right microphone 44 to receive without any interference the environment sounds. Left microphone 42 and right microphone 44 are operatively connected to the integral processor device 46, wherein the integral processor device 46 is embedded inside the compartment 28. As shown in FIG. 2. Nevertheless, it should be considered that a plurality of microphones may be attached along the frame assembly 20, wherein left microphone 42, right microphone and/or the plurality of microphones may be attached in an external periphery of the frame assembly 40. Audio assembly 40 is powered by a battery 100, wherein said battery 100 may be a button cell or any suitable embodiment known in the art. In a preferred embodiment, the battery 100 may be integrated with the integral processor device 46. Integral processor device 46 may be housed inside the compartment and secured by means of the cover. Nevertheless, it should be considered for integral processor device 46 that may be coupled in an external periphery of the frame assembly, thereby audio assembly 40 may be attached and detached from the frame assembly or any other frame for glasses known in the art.

Visual assembly 60 includes a left LED set 62, a right LED set 64 and a visual protective cover 66. In an exemplary embodiment, left LED set 62 may be placed in the rear surface of the left rim 22 around the circumference thereof. In a suitable embodiment left LED set 62 is operatively connected to the integral processor device 46 and powered by means of the battery 100, wherein the left LED set 62 may be a DIP type, a SMD type, a COB type or any variation thereof. It should be considered that the left LED set 62 may have a multiple-color emitting light. Nevertheless, it may be considered for visual assembly 60 that a plurality of emitting lights well known in the art may be suitable to be attached to the frame assembly 20. In one embodiment right LED set 64 may be placed in the rear surface of the right rim 24 around the circumference thereof. In a suitable embodiment right LED set 64 is operatively connected to the integral processor device 46 and powered by means of the battery 100, wherein the right LED set 64 may be a DIP type, a SMD type, a COB type. or any variation thereof. It should be considered that the right LED set 64 may have a multiple-color emitting light. Nonetheless, left LED set 62 and right LED set 64 may be LED strips that may be configured to be removably attached to the frame assembly 20. In a suitable embodiment, the emitted light from the left LED set 62 and right LED set 64 may be adjusted to reduce the luminous intensity. In a preferred embodiment, visual protective cover 66 may be a filter to reduce the exposure to the light emitted by the left LED set 62 and right LED set 64, wherein visual protective cover 66 may be a dark-tinted glass, plastic or any other suitable material. Visual protective cover 66 may have a suitable shape to cover the left LED set 62 and right LED attached around the periphery of the left rim 22 and the right rim 24 respectively. It should be considered that visual protective cover 66 may be attached to the left LED set 62 and right LED. In a suitable variation protective cover 66 may be included on the left LED set 62 and right LED.

Figure 3:
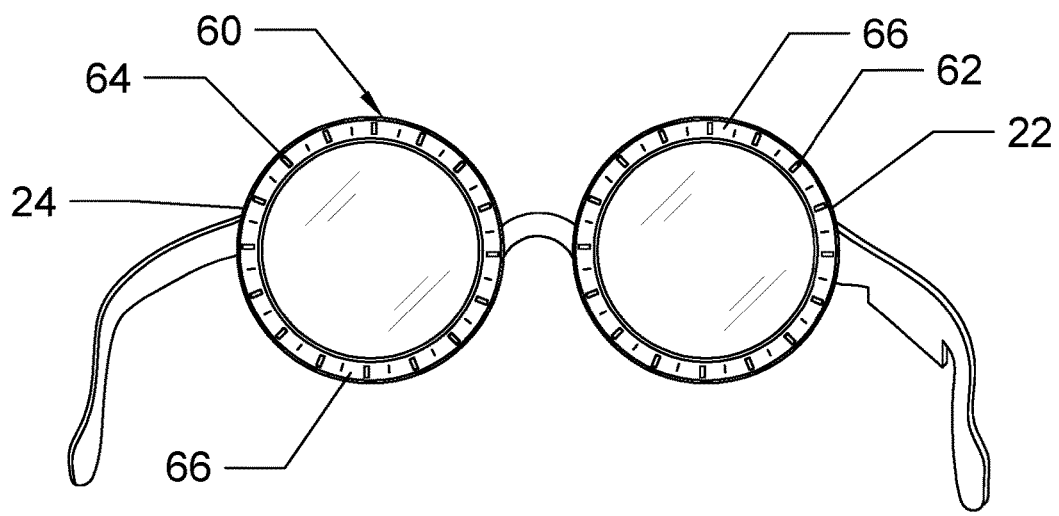
FIG. 3 illustrates a rear view of the present invention 10, wherein the left rim LEDs 62 are attached along the circumference of the left rim 22 and the right rim LEDs 64 are attached along the circumference of the left rim 24.

It should be recognized that FIG. 3 illustrates an embodiment of the present invention 10 where the visual assembly 60 is placed in a portion of the rear surface of the left rim 22 and the right rim 24 around the circumference thereof. It should be considered that visual assembly 60 may be housed inside the left rim 22 and the right rim 24 respectively, wherein a top portion of the LED lenses of the visual assembly 60 may be placed parallel with respect to the rear surface of the left rim 22 and right rim 24 respectively.

Figure 4:
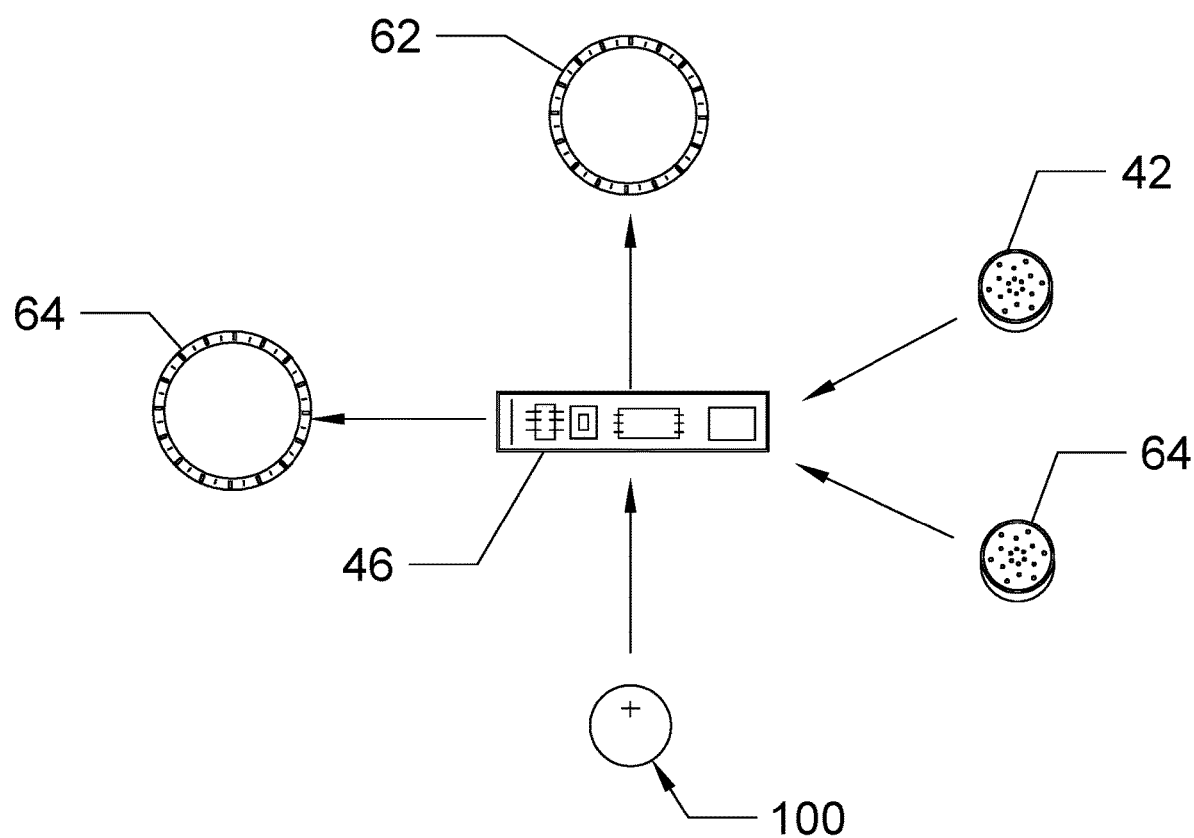
FIG. 4 is a representation of the operative connection between the integral processor device 46, a left microphone 42, a right microphone 44, a left rim LEDs 62, a right rim LEDs 64 powered by a battery 100.

Referring now to FIG. 4, there is disclosed an operative connection between the audio assembly 40 and the visual assembly 60, wherein the left microphone 42 and the right microphone 44 are receptive from audible signals from the environment, thereby the integral processor device 46 process the audible signal to a visual signal by means of the visual assembly 60, wherein the visual assembly 60 may emit different color light, variable intensity of emitted light, light emitted sections in accordance of the audible signal received and processed. With particular reference to FIG. 1, it is clear that the present invention 10 may be configured to be used on the eyes of a user, allowing the user without hearing or with hearing loss to have an alternative means of audible sounds through visual representation. It should be considered that the present invention 10 may be removably attached to a suitable glasses frame when required by the user.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. Glasses for the hearing impaired, comprising:
   a frame assembly including a left rim, a right rim, a compartment, and temples, wherein said left rim and said right rim are attached, said frame assembly includes a hinge mechanism, said hinge mechanism permits said temples to be folded toward said left rim and said right rim;
   an audio assembly having a left microphone, a right microphone and an integral processor device, wherein said left microphone and said right are attached to said rim, said integral processor device is attached to at least one of said temples; and
   a visual assembly including a left LED set and a right LED set, wherein said left LED set is attached to a periphery of said left rim, said right LED set is attached to a periphery of said right rim; wherein said left LED set and said right LED set includes a visual protective cover attached in a front portion that conforms with the shape thereof; wherein said visual protective cover is a filter to reduce the luminous intensity emitted by said left LED set and said right LED.

2. Glasses for the hearing impaired of claim 1, wherein said left rim and said right rim have a hole in a portion of a front surface thereof.

3. Glasses for the hearing impaired of claim 1, wherein said temples have a cuboid compartment in at least one temple of said temples.

4. Glasses for the hearing impaired of claim 3, wherein said compartment has a hollow portion with a removable cover.

5. Glasses for the hearing impaired of claim 1, wherein said left microphone and said right microphone are housed inside the left rim and said right rim respectively, wherein said left microphone is placed parallel to said left rim hole and said right microphone is placed parallel to said right rim hole.

6. Glasses for the hearing impaired of claim 1, wherein said left LED set is attached to a portion of a rear surface of said left rim and said right LED set is attached to a portion of a rear surface of said right rim.

7. Glasses for the hearing impaired of claim 1, wherein said left microphone, said right microphone, said left LED set, said right LED set and said integral processor device are operatively connected there between and powered by means of a battery.

8. Glasses for the hearing impaired, comprising:
- a frame assembly including a left rim, a right rim, a compartment, and temples, wherein a portion of said left rim and a portion of said right rim are attached by means of a bridge, a hole is included in a portion of said left rim, a hole is included in a portion of said right rim, a portion of said left rim and a portion of said right rim are attached to said temples by means of a hinge mechanism, said hinge mechanism permits said temples to be folded toward said left rim and said right rim;
- an audio assembly having a left microphone, a right microphone and an integral processor device, wherein said left microphone and aid right microphone are housed inside said left rim and said right rim respectively, said left microphone is placed centered in parallel with respect to said hole of said left rim, said right microphone is placed centered in parallel with respect to said hole of said right rim, said integral processor device is housed in said compartment; and
- a visual assembly including a left LED set and a right LED set, wherein said left LED set is attached around the circumference of a rear surface of said left rim, said right LED set is attached around the circumference of a rear surface of said right rim, said left LED set, said right LED set and said integral processor device are operatively connected and powered by means of a battery.

9. Glasses for the hearing impaired, consisting of:
- a frame assembly including a left rim, a right rim, a compartment, and temples, wherein said left rim and said right rim have a circular shape with a central hollow area, wherein lenses are housed inside said central hollow area respectively, wherein a portion of said left rim and a portion of said right rim are attached by means of a bridge, a hole is included in a portion of a front surface of said left rim, a hole is included in a portion of a front surface of said right rim, a portion of said left rim and a portion of said right rim are attached to said temples by means of a hinge mechanism, said hinge mechanism permits said temples to rotate from a perpendicular position with respect to said left rim and said right rim toward a vertical position with respect to said left rim and said right rim, said compartment is placed in at least one of said temples, wherein said compartment has a hollow portion with a removable cover;
- an audio assembly having a left microphone, a right microphone and an integral processor device, wherein said left microphone and aid right microphone are housed inside said left rim and said right rim respectively, said left microphone is placed centered in parallel with respect to said hole of said left rim, said right microphone is placed centered in parallel with respect to said hole of said right rim, said integral processor device is housed in said compartment, said left microphone, said right microphone and said integral processor device are operatively connected and powered by means of a cell button integrated in said integral processor device; and
- a visual assembly including a left LED set, a right LED set and a visual protective cover, wherein said left LED set is attached around the circumference of a rear surface of said left rim, said right LED set is attached around the circumference of a rear surface of said right rim, said left LED set, said right LED set and said integral processor device are operatively connected and powered by means of a battery, wherein said left LED set and said right LED set emit a predetermined sequence light according to an audible sound received from said left microphone and said right microphone that is processed by means of said integral processor device, said visual protective cover is a filter to reduce the luminous intensity of said left LED set and said right LED, said visual protective cover has a shape that conforms with the shape of said left LED set and said right LED, said visual protective cover is attached to said left LED set and said right LED.

* * * * *